Figure 1:
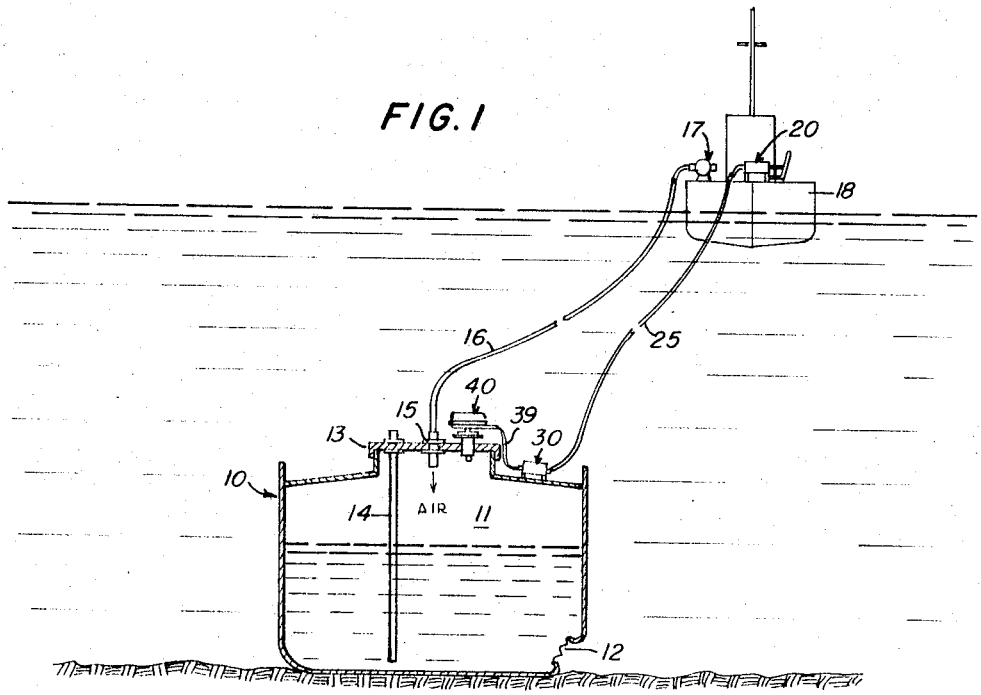

INVENTOR
CHARLES C. CLOUTIER
BY Beall and Jones
ATTORNEYS

Sept. 5, 1967           C. C. CLOUTIER           3,339,513
PRESSURE STABILIZING AIR VOLUME CONTROL SYSTEM
Filed Aug. 10, 1965           2 Sheets-Sheet 2
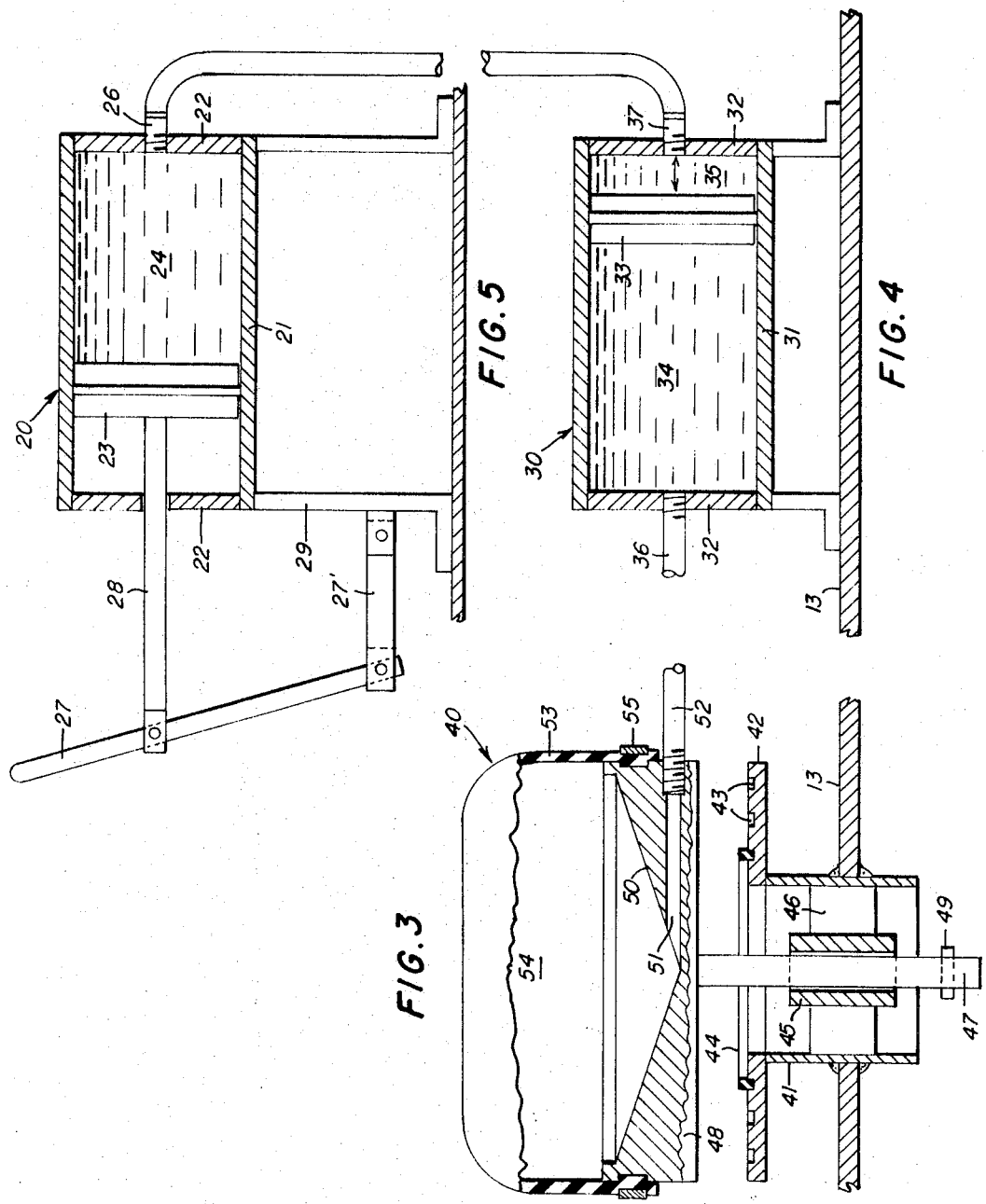
INVENTOR
CHARLES C. CLOUTIER
BY Beale and Jones
ATTORNEYS United States Patent Office 3,339,513
Patented Sept. 5, 1967

3,339,513
PRESSURE STABILIZING AIR VOLUME
CONTROL SYSTEM
Charles C. Cloutier, Box 885,
Morgan City, La. 70380
Filed Aug. 10, 1965, Ser. No. 478,721
19 Claims. (Cl. 114—50)

This invention relates to an improved method and means for raising sunken vessels or other floatable containers to the surface by means of compressed air or gases introduced into a compartment of the vessel or into an attached salvage device in such manner that positive control of the buoyant lift is maintained at all times and the vessel or salvage device is not subjected at any time to damaging pressures. Although described and shown in connection with salvage operations only the principle of this invention is equally adaptable to marine drilling rig and bridge construction application or any other submersible system requiring reliable and precise buoyancy control.

In salvage operations on vessels of appreciable size compressed air is used in various ways to displace water in either a compartment of the vessel or an attached salvage device to obtain the necessary lift to raise the vessel to the surface. The difference in hydrostatic pressure at different depths presents major problems in controlling the lifting force, rate of ascent and the type of equipment used. When a completely closed container such as a pontoon or a compartment of the ship is used for buoyant lift the walls of such compartment or pontoon must be constructed sufficiently strong to withstand the change in hydrostatic pressure as the vessel is raised or the internal pressure changed as the outside hydrostatic pressure changes. Various pressure adjusting systems have been developed in the past, but none have been flexible enough and easily controlled at will from a remote location to be entirely satisfactory.

When an open bottom compartment or salvage device is used to obtain the buoyant lift a more difficult problem exists. As the vessel rises the hydrostatic pressure decreases and air contained in the compartment or salvage device expands in accordance with Boyle's law wherein $PV/T = P'V'T'$, thus displacing more water and increasing the buoyant lift accordingly. More than one disaster has occurred in past salvage operations due to excessive rate of rise because of the previous inability to reliably and automatically maintain a constant displaced volume as the hydrostatic pressure decreased during the rise.

Still another serious problem exists because of the necessity to develop a buoyant lift considerably in excess of that required to float the vessel in order to overcome the "break away" suction and adhesive forces that tend to hold the vessel in contact with the bottom. Such excess lift has to be reduced immediately to eliminate the danger of too rapid a rise. The only known device that will automatically accomplish such a result functions on the basis of speed of the rise and would not be acceptable under certain critical conditions when a very slow rate of ascent must be initiated and maintained.

It is the primary object of this invention to overcome these problems and to provide a method and means for raising a submerged vessel that is easy to apply and permits positive and effective control of the buoyant lifting forces at all times.

It is another object of this invention to provide a method and means for raising a submerged vessel that permits positive and effective control of the buoyant lifting forces from a remote location.

A further object of this invention is to provide a method and means for raising a submerged vessel that automatically maintains a constant volume of displaced water in a buoyancy lifting system at varying depths.

Another further object of this invention is to provide a method and means for raising a submerged vessel that automatically reduces the volume of displaced water in a buoyancy lifting system as the depth of submergence decreases.

Yet a still further object of this invention is to provide a method and means for raising a submerged vessel that provides positive and effective means to vary the volume of displaced water in a buoyancy lifting system from a remote location.

Another object of this invention is to provide a method and means for raising a submerged vessel that provides positive and effective means to automatically balance internal and external hydrostatic pressures in a buoyancy lifting system.

A further object of this invention is to provide a method and means for raising a submerged vessel that provides positive and effective means to automatically decrease the differential between internal and external hydrostatic pressures in a buoyancy lifting system as the depth of submergence decreases.

A still further object of this invention is to provide a method and means for raising a submerged vessel that provides positive and effective means to vary the internal-external hydrostatic pressure differential in a buoyancy lifting system from a remote location.

An additional object of this invention is to provide a pressure and gas volume system submerged in a liquid medium that automatically maintains a constant volume of displaced liquid at differing depths of submergence.

An additional object of this invention is to provide a pressure and gas volume system submerged in a liquid medium that automatically reduces the volume of displaced liquid as the depth of submergence decreases.

An additional object of this invention is to provide a pressure and gas volume system submerged in a liquid medium that permits variation of the volume of displaced liquid at will from a remote location.

An additional object of this invention is to provide a pressure and gas volume system submerged in a liquid medium that automatically maintains a constant differential between internal and external pressures at differing depths of submergence.

An additional object of this invention is to provide a pressure and gas volume system submerged in a liquid medium that automatically reduces the differential between internal and external pressures as the depth of submergence decreases.

An additional object of this invention is to provide a pressure and gas volume system submerged in a liquid medium that permits variation of the differential between internal and external pressures at will from a remote location.

It is an object of this invention to provide regulating means in a gas system submerged in a liquid medium that automatically maintains a constant volume of gas at differing depths of submergence.

It is an object of this invention to provide regulating means in a gas system submerged in a liquid medium that automatically reduces the volume of gas as the depth of submergence decreases.

It is an object of this invention to provide regulating means in a gas system submerged in a liquid medium that permits variation of the volume of gas at will from a remote location.

It is an object of this invention to provide regulating means in a gas system submerged in a liquid medium that automatically maintains a constant differential between internal and external pressures at differing depths of submergence.

It is an object of this invention to provide regulating means in a gas system submerged in a liquid medium that permits variation of the differential between internal and external pressures at will from a remote location.

It is another object of this invention to provide a salvage device having means to vary its buoyant lift from a remote location and automatic means to maintain a set buoyant lift constant over varying depths.

It is another object of this invention to provide a salvage device having means to vary its buoyant lift from a remote location and automatic means to reduce a set buoyant lift as the depth or submergence is decreased.

With the foregoing and other objects in view which will appear as the description proceeds, the invention consists of certain novel features, arrangements and combinations of parts, hereinafter more fully described and pointed out in the claims, it being understood that changes may be made in the construction and arrangement of parts without departing from the spirit of the invention.

Figure 2:
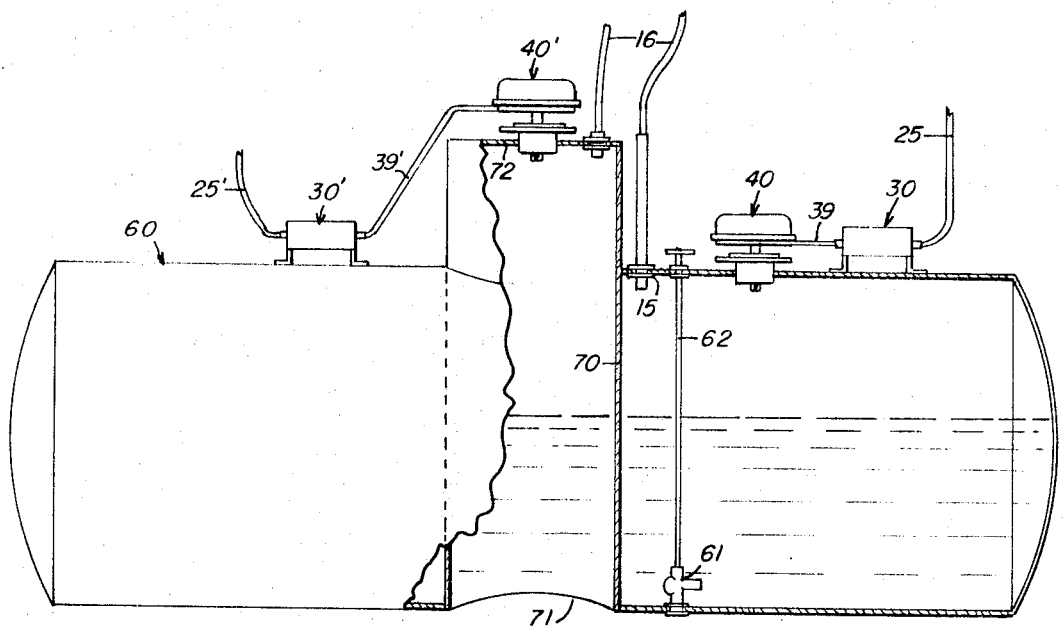

In the accompanying drawings:

FIG. 1 is a sectional elevation showing diagrammatically a sunken vessel with the valve mechanism of the invention applied thereto and the general arrangement of parts used in carrying out the invention, FIG. 2 is a vertical sectional view in diagrammatic outline showing a salvage device with the valve mechanism of the invention applied thereto, FIG. 3 is an enlarged vertical cross section in diagrammatic outline of the valve mechanism of FIGS. 1 and 2, FIG. 4 is an enlarged vertical cross section in diagrammatic outline of the bias controlling cylinder of FIGS. 1 and 2 used to vary the bias on the valve mechanism of FIG. 3, and FIG. 5 is an enlarged vertical cross section in diagrammatic outline of one form of remote operating means for the bias controlling cylinder of FIG. 4.

The invention consists primarily in the novel means of maintaining a constant volume of displaced liquid such as water in a submerged container independently of the depth of submergence combined with the capability of easily and quickly changing such volume at will from a remote location. It is a well known principle of hydrodynamics that the hydrostatic pressure varies directly with depth, therefor the difference in hydrostatic pressures at two depth a given distance apart will be equal to the differences of hydrostatic pressures at all other depths for the same medium the same distance apart. A device responsive to two such pressures will for a given setting be equally responsive to a corresponding difference at all depths. Conversely such a device given a different setting will establish the equivalent response to a new set of pressures.

Such a device is a commonly called reverse flow check valve biased closed on the reverse flow side. A valve of this nature will then open when a pressure on the flow side is greater than the combined bias plus the pressure on the reverse flow side and remain closed when the reverse pressure relationship exists. Such a valve installed in an upper part of a submerged container can then be used to vent the inside of the container to maintain a certain difference between the internal and external pressures dependent upon the specific bias set. A change in bias will in turn establish a new pressure differential.

When a gas under pressure such as air is continuously pumped into submerged container having the biased reverse flow valve of this invention installed therein the internal pressure will increase to equal the bias set on the valve and thereafter be vented through the valve to maintain a constant differential. If free communication is also provided to the interior of the container at some low point water can then be displaced until the set pressure differential has been established by the height of the displaced water. Thereafter the height and consequently the volume of displaced water will remain constant for a given bias setting and air will be vented at the rate it is being pumped in.

A heavy non-compressible liquid such as mercury provides a convenient means to apply an adjustable closing bias to the valve that is relatively independent of external hydrostatic pressure while air confined in an expansible container provides a convenient means to apply an opening bias to the valve that automatically increases as the external hydrostatic pressure decreases. Appropriate selection of effective valve face area, quantity of mercury and volume of air used permits any desired degree of control to be exercised.

It will be obvious to those skilled in the art that this simplified explanation of the principles involved as applied to this invention touches only lightly on the physical laws interrelating pressure, volume and temperature. Such interrelationships not specifically referred to however produce minimal effects and do not materially affect the operation of the invention as herein described.

Referring now to the drawings and specifically to FIG. 1 the numeral 10 represents in general a ship or like floatable vessel submerged in a body of water wherein one or more of its compartments 11 is to be used as an air chamber to develop the buoyant lift to raise the vessel. Without digressing into the principles of salvage operations in general this description is limited to its application to a single compartment by way of illustration. The compartment to be used may be ruptured at some low point 12 therein otherwise it is essentially air and watertight in the upper portions.

A hatch 13 in the upper portion of the compartment is fitted as by welding with a conduit 14 extending to some low point in the compartment to provide free communication to the interior of the compartment when the rupture shown at 12 does not exist. The conduit 14 is preferably flexible and noncollapsible to facilitate handling. A fitting 15 is also provided in the hatch 13, or elsewhere to the compartment if desired, to which an airline 16 is attached for continuously supplying air under pressure from any suitable type air compressor 17 located on a salvage vessel 18 at the surface.

A remote liquid positive displacement piston unitl 20, also located on a surface salvage vessel 18, through a liquid line 25 actuates a bias control cylinder unit 30 to change the weight bias on valve mechanism 40 through a flexible conduit 39. The control cylinder unit 30 is supported in any suitable manner adjacent to valve mechanism 40 so that the flexible conduit 39 does not interfere with the free movement of the mechanism.

The basic features of one of the simplest designs of the valve mechanism 40 is shown in detail in FIG. 3 wherein a cylindrical base portion 41 is welded to the hatch 13 and terminates at its upper end with a horizontal outwardly projecting annular rim 42 having one or more concentric annular recesses 43 in its upper surface to receive an appropriate annular sealing ring 44. A cylindrical axially extending guide 45 is centrally supported in the base member 41 by axially extending radial webs 46 and holds the guide rod 47 to which the valve face unit 48 is attached. Pin 49 may be used to prevent unwanted separation of the valve face and valve seat parts.

The underside of valve face unit 48 is machined to make sealing contact with the sealing ring 44 positioned in any one of the recesses 43. The upper surface 50 is funnel shaped to insure that liquid will cover the apex point at limited angles of tilt. A radial passage 51 extends from the funnel apex to the outer side surface terminating in the fitting 52 to which the flexible conduit 39 is attached. A flexible dome shaped cover 53 is fitted over the outer peripheral surface of valve face unit 48 forming the bias chamber 54 and is securely held thereto by clamping band 55.

The bias control cylinder 30, shown in FIG. 4, consists of an outer cylindrical casing 31 closed at each end by a face plate 32 and contains a movable liquid separating piston 33 that separates the interior of the cylinder into two compartments 34 and 35. Fittings 36 and 37 provide outlet connections for compartments 34 and 35 and attaching means to conduits 39 and 25, respectively. The cylinder is supported on appropriate leg members 38.

One compartment 34 and its attached conduit 39 is completely filled with a heavy liquid such as mercury. When piston 33 is caused to move in a right hand direction mercury is forced into bias chamber 54 and increases the weight bias on valve 40 by an amount equal to the difference between the weight of the mercury in chamber 54 and the weight of an equal volume of water. Compartment 35 and its attached conduit 25 is completely filled with water which supplies the moving force for piston 33 by the remote unit 20.

The remote unit 20, shown in FIG. 5 is a similar cylinder 21 closed at each end by end plates 22 forming a compartment 24 on one side of the manually movable piston 23. Compartment 24 is connected to conduit 25 by the fitting 26 and is also filled with water to form a liquid positive displacement system between cylinders 21 and 31. Movement of piston 23 causes a positive corresponding movement of piston 33. Movement of piston 23 is obtained by handle 27 pivotally joined to the piston rod 28 and the support leg member 29 by the intermediate link or fulcrum 27.

Referring now to FIG. 2 the invention is shown adapted to a salvage device 60 such as a pontoon, one or more of which are to be secured by appropriate bridle means (not shown) to a submerged vessel. The device can be any appropriate shape and for convenience the one shown here is cylindrical with a horizontal axis. The valve mechanism 40 of the invention is attached at any convenient point in the upper portion of the device and is biased by its associated bias control cylinder 30 which is actuated from a remote location as previously described. Air is continuously supplied through a fitting 15 by the conduit 16. Displaced water from the device is ejected through an appropriate cutoff valve 61 at a bottom point that can be closed by reach rod 62 when it is desired to maintain the device in a set flotatable condition.

Fine control of the buoyant lifting force is provided by fitting a separate cylindrical compartment 70 to the device 60 oriented vertically so that a unit change in height of displaced water will provide a much smaller lift than the equivalent height change in the main compartment. Compartment 70 completely pierces device 60 at a central position and has an open bottom 71. A separately controlled but otherwise equivalent valve mechanism 40′ in the top 72 and bias control system 30′ is used to control the displaced volume. Compressed air is continuously supplied through a fitting 15′ from the common supply conduit 16 or if desired by a separate line.

In applying the invention directly to a compartment of a sunken vessel it is preferable that the vessel have settled in a approximately upright position although it is not mandatory. It is necessary to be able however to plan the operation so that a selected attitude can be maintained essentially constant throughout the raising operation.

As a preliminary step the hatch 13 is removed by divers and carried to the surface for installation of the conduit 14, fitting 15 and base portion 41 of the valve mechanism, and then re-installed. Base portion 41 may be installed at some predetermined angle of inclination consistent with the planned attitude since it is seldom feasible to plan to raise a sunken vessel on an even keel. If no hatch is appropriately located then an opening in the upper part of the compartment can be cut, over which an equivalent cover containing the necessary apparatus can be secured by welding.

The largest annular sealing ring 44 is installed that will maintain the pressure differential required for the height of displaced water that is to be produced in the compartment to take advantage of the finest degree of control available. Bias chamber 54 is charged with an amount of air that is required to produce the counter biasing effect to automatically compensate for the excessive buoyant lift that is required to break the vessel away from the bottom. When no automatic bias compensation is desired bias chamber 54 is evacuated and the valve mechanism will then maintain a constant volume of displaced water at all depths.

When all equipment is installed and it is desired to raise the sunken vessel, air is continuously pumped into each compartment so fitted and any pontoon salvage devices that may also be used to provide additional lifting force or used to maintain a desired attitude of the vessel as it is raised to the surface. The remote units 20 controlling each compartment and pontoon device are manipulated individually to establish a bias on each valve unit 40 in accordance with a predetermined schedule which can be remotely adjusted to produce the rates of increase and amount of lifting forces required to break the submerged vessel from the bottom and give it a controlled rate of ascent to the surface.

As air is pumped into each compartment its associated valve 40 remains closed until water inside the tank has been displaced to a height that produces a differential hydrostatic pressure that is balanced by the bias on valve 40. Thereafter, for a specific bias, air automatically escapes through valve 40 at such a rate as is required to maintain a constant height of displaced water in the compartment, thus producing a constant buoyant lifting force.

In raising a vessel when automatic bias compensation is not used, manual readjustment of one or more of the remote units is usually required after breaking from the bottom to reduce the buoyant lifting forces and prevent the vessel from rising so rapidly that the undue strain on the salvage gear is not produced when the surface is broken. After the surface has been broken the mercury in valve 40 is then displacing air instead of water and will continue to function in its normal manner but with a materially increased bias. Bias on the valves can then be adjusted to float the vessel at any desired flotation level down to one that is produced when the height of displaced water in all compartments in increased to the maximum obtainable.

When the bias chambers 54 have been previously charged with air, the flexible covers 53 will begin to extend as the depth decreases thus enlarging chambers 54 and increasing their counter bias force on the valve. This increasing counter bias force automaticaly reduces the resultant bias on the valve units 40 inversely with the depth. As the depth decreases the buoyant lifting force within the vessel is therefore automatically decreased until it exactly balances the total weight of the vessel being raised and it comes to rest in a suspended equilibrium condition. Thereafter, further increases in the weight bias on the valves by manipulation of remote units 20 establish new, shallower equilibrium depts. In effect the vessel is raised to any submerged, semi-submerged or afloat condition desired by a succession of stages wherein the bias on valve 40 is manually increased and then automatically decreased proportionally with the depth.

When flexible cover 53 is made flexible but non-stretchable, it will act as a bellows, and when fully extended cease to produce a counter bias as the depth continues to decrease. Above such a depth the remote operator then exercises complete bias control through his remote unit 20.

It is to be understood that the invention is not limited to use of mercury as a biasing liquid nor the described means of operation of the piston 33 in the bias control cylinder 30 from a remote location. Any relatively non-compressible liquid with appreciable weight may be used and any suitable remote actuating means that produces a positive forward and reverse movement of piston 33 may be employed. Also the dome shaped cover 53 forming a cover for bias chamber 54 may be divided into two or more separate compartments, or a separate chamber attached thereto to provide the closing and counter opening biases employed in practicing the invention.

I claim as my invention:

1. Pressure and gas volume control system for regulating the pressure and gas volume inside a closed vessel submerged in a liquid at varying depths comprising; means to supply a gas to said vessel; communication means between said liquid and a first low point inside said vessel to permit flow of liquid to and from said vessel; a second communication means having a biased reverse flow preventing means therein between said liquid and a second point inside said vessel above said first point for releasing gas from said vessel; and means to vary the bias on said reverse flow preventing means thereby controlling the flow of gas from said vessel by changing the pressure differential required to open said reverse flow preventing means; said biased reverse flow preventing means comprising an underside valve face seatable against a valve seat in said second communication means and subjected to the gas pressure in said vessel, an upper valve side having a closed container attached thereabove and subjected to the external liquid pressure, and a connection to said container through which a second liquid is supplied and withdrawn by said means to vary the bias thereby varying said bias by varying the weight of said valve and attached container.

2. A system in accordance with claim 1 wherein said means to vary the bias comprises a closed cylinder having a movable piston contained therein, said piston having an actuating means on one first side, said cylinder on opposite second side of said piston connected by a flexbile communication means with said connection on said valve container, said cylinder on said second side of said piston being filled with said second liquid, whereby reciprocating movement of said piston forces said second liquid into and withdraws said second liquid from said valve container.

3. A system in accordance with claim 2 wherein said actuating means on one first side of said piston comprises a positive displacement fluid system operable from a remote location.

4. A system in accordance with claim 1 wherein said second liquid in said cylinder is heavier than said liquid said vessel is submerged in, and said container attached above said valve is constructed of a flexible, expandible material, thereby permitting a gas contained therein to expand as the depth of submergence decreases and automatically decrease said bias on said valve.

5. A displaced liquid volume system for regulating the volume of a gas inside a closed vessel submerged in a liquid independently of the depth of submergence of said vessel comprising; communication means between said liquid and a first low point inside said submerged vessel to permit free flow of liquid to and from said submerged vessel; means to continuously supply said gas to said submerged vessel whereby liquid in said submerged vessel is displaced with said gas; a second communication means having a reverse flow check valve means therein between said liquid and a second point inside said submerged vessel above said first point for releasing gas from said submerged vessel, said reverse flow check valve means subjected on one under side to the internal gas pressure of said submerged vessel and subjected on other upper side to a closing bias and the submerged external liquid pressure, said internal and external pressure differing by an amount equal to said closing bias and equivalent to the weight of a unit column of said liquid having a height equal to the vertical distance between said check valve means and the surface of said liquid in said submerged vessel whereby said check valve means releases said gas from said submerged vessel to maintain a specific height of displaced liquid for a given closing bias independently of the depth of submergence of said vessel; and means to vary said closing bias thereby regulating the height and consequently the volume of displaced liquid in said submerged vessel; said reverse flow check valve means and said closing bias thereon comprising a closed container attached to said check valve means, and a connection means to said closed container through which a second liquid is supplied and withdrawn by said means to vary said closing bias thereby varying said closing bias by changing the weight of said second liquid in said closed container.

6. A system in accordance with claim 5 wherein said means to vary said closing bias comprises a closed cylinder having a movable piston contained therein, said piston having an actuating means on one first side, said cylinder on opposite second side of said piston connected by a flexible communication means with said connection means on said closed container, said cylinder on said second side of said piston being filled with said second liquid, whereby reciprocating movement of said piston forces said second liquid into and withdraws said second liquid from said closed container.

7. A pressure stabilizing system for regulating the gas pressure inside a closed vessel submerged in a liquid in relation to the pressure on the exterior of said vessel at varying depths of submergence comprising; communication means between said liquid and a first low point inside said submerged vessel to permit free flow of liquid to and from said submerged vessel; means to continuously supply a gas to said submerged vessel whereby liquid in said submerged vessel is displaced with said gas; a second communication means having a reverse flow preventing means therein between said liquid and a second point inside said submerged vessel above said first point for releasing gas from said vessel, said reverse flow preventing means having a closing bias thereon whereby said gas is released through said second communication means to maintain a difference between gas pressure inside said submerged vessel and external liquid pressure on said reverse flow preventing means balanced by said closing bias, said difference in pressures being maintained independently of submerged depth; and means to vary said closing bias thereby regulating the difference in pressures balanced by said closing bias; said reverse flow preventing means and said closing bias thereon comprising an underside valve face seatable against a valve seat in said second communication means and subjected to the gas pressure in said vessel, an upper valve side having a closed container constructed in part of flexible and expandible material attached thereabove and subjected to the external liquid pressure, and a connection to said container through which a second liquid heavier than said aforementioned liquid is supplied and withdrawn by said means to vary said closing bias thereby manually varying said closing bias by varying the weight of said attached container.

8. A system in accordance with claim 7 wherein said means to vary said closing bias comprises a closed cylinder having a movable piston contained therein, said piston having an actuating means on one first side, said cylinder on opposite second side of said piston connected by a flexible communication means with said connection on said valve container, said cylinder on said second side of said piston being filled with said second liquid, whereby reciprocating movement of said piston forces said second liquid into and withdraws said second liquid from said container.

9. A system in accordance with claim 8 wherein said container constructed in part of a flexible and expandible material is precharged with a certain quantity of an expandible gas whereby said expandible gas provides a counter opening bias on said reverse flow preventing means varying automatically in inverse proportion to the depth of submergence of said vessel.

10. A salvage device having means to supply air thereto for attachment to and raising of submerged objects in a body of water comprising a chamber having an opening at the underside thereof, biased reverse flow check valve means at the upper side thereof for releasing air from said chamber, and control means to vary the bias on said check valve.

11. A salvage device in accordance with claim 10 wherein said biased reverse flow check valve means comprises an underside valve face seated against a valve seat attached to said chamber and subjected to the air pressure in said chamber, an upper valve side having a closed container attached thereabove and subjected to the submerged water pressure, a connection to said container through which a relatively non-compressible liquid is supplied and withdrawn by said control means to vary the bias on said check valve.

12. A salvage device in accordance with claim 11 wherein said control means to vary the bias on said check valve comprises a closed cylinder having a movable piston contained therein, said piston having an actuating means on one first side, said cylinder on opposite second side of said piston connected by a flexible communication means with said connection on said valve container, said cylinder on said second side of said piston being filled with said relatively non-compressible liquid, whereby said liquid is supplied to and withdrawn from said valve container by forward and reverse movement of said piston.

13. A salvage device in accordance with claim 12 wherein said actuating means on one first side of said piston comprises a positive displacement fluid system operable from a remote location.

14. A salvage device in accordance with claim 10 wherein said control means comprises a manual biasing means and an automatic biasing means, said automatic biasing means decreasing said bias automatically as depth of submergence of said device is decreased.

15. A salvage device in accordance with claim 14 wherein said biased reverse flow check valve means comprises an underside valve face seated against a valve seat attached to said chamber and subjected to the air pressure in said chamber, an upper valve side having a closed container attached thereabove and subjected to the submerged water pressure, a connection to said container through which a relatively non-compressible liquid heavier than water is supplied and withdrawn by said manual biasing means thereby changing the weight of said valve and attached container to vary said bias thereon, said closed container being constructed of a flexible expandible material, thereby permitting a gas contained therein to expand as the depth of submergence decreases and automatically decrease the bias on said valve.

16. A salvage device in accordance with claim 15 wherein said manual biasing means comprises a closed cylinder having a movable piston contained therein, said piston having an actuating means on one first side, said cylinder on opposite second side of said piston connected by a flexible communication means with said connection on said valve container, said cylinder on said second side of said piston being filled with said liquid heavier than water, whereby said liquid heavier than water is supplied to and withdrawn from said valve container by forward and reverse movement of said piston.

17. A salvage device in accordance with claim 16 wherein said actauting means on one first side of said piston comprises a positive displacement fluid system operable from a remote location.

18. A method of lifting a vessel submerged in a body of water which comprises forming a substantially air and water-tight compartment therein, said compartment being air and water-tight above a certain low point therein and in free communication with said body of water below said low point thereby permitting water to flow freely into or out of said compartment; continuously forcing a compressed gas into said compartment thereby displacing said water in the upper part of said compartment and establishing a buoyant lifting force in said compartment; increasing the buoyancy of said compartment to a value established by the bias on a variable biased discharge valve means located at a high point in said compartment and thereafter continuously releasing excess gas from said biased discharge valve, said biased discharge valve means having a remote selective means to vary the bias and a means responsive to the depth of submergence, said depth responsive means decreasing the bias as the depth of submergence decreases; remotely varying the bias on said biased valve means to increase the buoyant lift until said submerged vessel starts to rise; and controlling the rate and extent of rise of said submerged vessel by successively increasing said bias by said remote means as the bias is decreased proportionally by said depth responsive means.

19. Pressure and gas volume control system for regulating the pressure and gas volume inside a closed vessel submerged in a liquid at varying depths comprising; means to supply a gas to said vessel; communication means between said liquid and a first low point inside said vessel to permit flow of liquid to and from said vessel; a second communication means having a biased valve means therein between said liquid and a second point inside said vessel above said first point for releasing gas from said vessel; means to vary the bias on said biased valve means thereby controlling the flow of gas from said vessel by changing the pressure differential required to open said biased valve means; said means to vary the bias comprising a remote means to selectively vary the bias and a means responsive to the depth of submergence, said depth responsive means decreasing the bias proportionally as the depth of submergence decreases.

References Cited

UNITED STATES PATENTS

| | | | |
|---|---|---|---|
| 2,359,366 | 10/1944 | Katcher et al. | 114—235 |
| 2,363,488 | 11/1944 | Bartlett | 114—50 |
| 2,451,002 | 10/1948 | Sturtevant | 114—54 |
| 2,635,574 | 4/1953 | Sturtevant | 114—54 |
| 3,085,533 | 4/1963 | Goryl et al. | 114—16 |

MILTON BUCHLER, *Primary Examiner.*

ANDREW H. FARRELL, *Examiner.*